Patented July 11, 1944

2,353,351

UNITED STATES PATENT OFFICE 2,353,351

PROCESS FOR THE MANUFACTURE OF 1-AMINOBENZENE-4-SULPHO-2-CARBOXYLIC ACID

Eduard Moser, Basel, Switzerland, assignor to the Swiss firm of Society of Chemical Industry in Basle, Basel, Switzerland No Drawing. Application February 5, 1943, Serial No. 474,880. In Switzerland January 13, 1942

2 Claims. (Cl. 260—507)

Direct sulphonation of anthranilic acid, as is known, does not lead to the desired end, as the carboxyl group is easily eliminated. It has therefore been recommended to carry out the sulphonation of anthranilic acid in the presence of solvents, preferably using molecular quantities of the sulphonating agent (compare German Patents Nos. 296,941 and 307,284).

It has now been found that, in spite of the ready elimination of the carboxyl group, homogeneous sulphonation of anthranilic acid is brought about very smoothly if the acid sulphate of anthranilic acid be heated at raised temperature, viz. at about 200° C., for example at 180° to 220° C., preferably under reduced pressure. In this manner, a product is obtained in practically quantitative yield in such a degree of purity that it can be used directly for the manufacture of dyestuffs. The new method of working, the success of which was not to have been foreseen, implies important progress in comparison with the patents above mentioned.

The following example illustrates the invention, the parts being by weight:

*Example*

100 parts of sulphuric acid of 98 per cent. strength are mixed in a mill with 137 parts of 1-aminobenzene-2-carboxylic acid in such a manner that a fine, homogeneous powder is obtained. This powder is filled into baking trays and is baked for 12 hours under reduced pressure at 200-220° C. The 1-aminobenzene-2-carboxy-4-sulphonic acid obtained is a pale grey powder which dissolves readily in caustic lyes and mineral acids. It may be used as such, without further purification. A yield of approximately 95 per cent. is obtained. Quite a similar result is obtained when working without a vacuum.

What I claim is:

1. Process for the manufacture of 1-aminobenzene-4-sulpho-2-carboxylic acid, comprising heating the sulphate of anthranilic acid at a temperature in the neighborhood of 200° C.

2. Process for the manufacture of 1-aminobenzene-4-sulpho-2-carboxylic acid, comprising heating the sulphate of anthranilic acid at a temperature in the neighborhood of 200° C., under reduced pressure.

EDUARD MOSER.